(12) United States Patent
West et al.

(10) Patent No.: US 6,446,176 B1
(45) Date of Patent: Sep. 3, 2002

(54) METHOD AND SYSTEM FOR TRANSFERRING DATA BETWEEN PRIMARY STORAGE AND SECONDARY STORAGE USING A BRIDGE VOLUME AND AN INTERNAL SNAPSHOT COPY OF THE DATA BEING TRANSFERRED

(75) Inventors: Christopher J. West, Boulder; Scott Adam States, Arvada, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/521,341

(22) Filed: Mar. 9, 2000

(51) Int. Cl.[7] .............................................. G06F 11/00
(52) U.S. Cl. ...................................... 711/162; 711/161
(58) Field of Search .................................. 711/161, 162

(56) References Cited

U.S. PATENT DOCUMENTS

| | | | |
|---|---|---|---|
| 5,155,845 A | * 10/1992 | Beal et al. ....................... | 714/6 |
| 5,537,533 A | 7/1996 | Staheli et al. .................... | 714/5 |
| 5,555,371 A | * 9/1996 | Duyanovich et al. .. | 395/182.11 |
| 5,623,599 A | * 4/1997 | Shomler ....................... | 714/18 |
| 5,692,155 A | 11/1997 | Iskiyan et al. | |
| 5,835,954 A | 11/1998 | Duyanovich et al. | |
| 6,131,148 A | * 10/2000 | West et al. .................. | 711/162 |

FOREIGN PATENT DOCUMENTS

WO          99 50747          10/1999

\* cited by examiner

*Primary Examiner*—Reba I. Elmore
(74) *Attorney, Agent, or Firm*—Brooks & Kushman P.C.

(57) ABSTRACT

A method and system for transferring data from a primary storage system to a secondary storage system in which the primary storage system includes primary storage volumes and a primary bridge volume and the secondary storage system includes secondary storage volumes and a secondary bridge volume. A link between the primary bridge volume and the secondary bridge volume is established. The data to be transferred from a primary storage volume to a corresponding secondary storage volume is then copied onto the primary bridge volume by using pointers to the data of the primary storage volume (internal snapshot copy). Snapshot copied data is then transferred from the primary bridge volume to the secondary bridge volume over the link. The data is then moved from the secondary bridge volume to the secondary storage volume corresponding to the primary storage volume to put the primary storage volume and the corresponding secondary storage volume in synchronization. This process enables the use of bridge volumes to handle data synchronization responsibilities in addition to data transferring responsibilities thereby allowing the host to not have to compete for access to primary storage volumes.

16 Claims, 4 Drawing Sheets

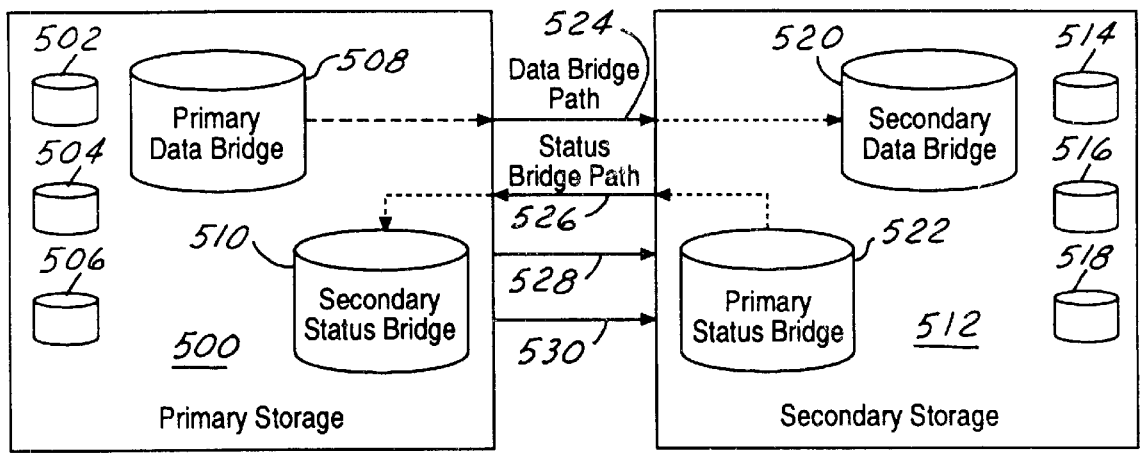
FIG. 5D
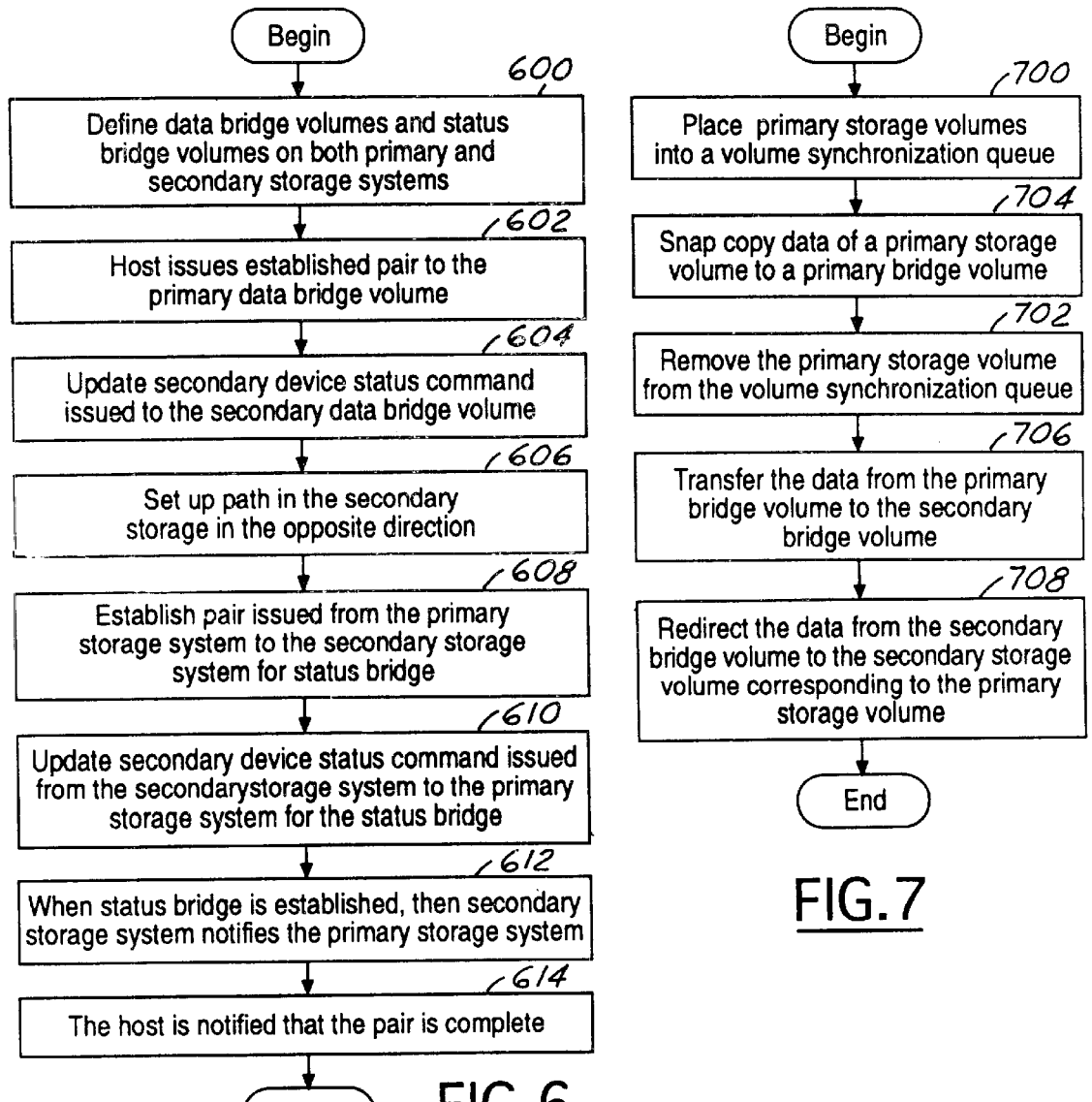
FIG. 6
FIG. 7

METHOD AND SYSTEM FOR TRANSFERRING DATA BETWEEN PRIMARY STORAGE AND SECONDARY STORAGE USING A BRIDGE VOLUME AND AN INTERNAL SNAPSHOT COPY OF THE DATA BEING TRANSFERRED

TECHNICAL FIELD

The present invention relates generally to peer-to-peer remote copy (PPRC) methods and systems and, more particularly, to a method and system for transferring data between a primary storage system and a secondary storage system using a bridge (surrogate) volume and an internal snapshot copy of the data being transferred.

BACKGROUND ART

With increasingly large amounts of data being handled in data processing systems, storage systems, such as disk storage systems are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system is currently employed to minimize the time in which access to data is lost due to a disaster.

Peer-to-peer remote copy (PPRC) is a synchronous copy mechanism that creates a copy of data at a remote or secondary storage system. This copy, at the secondary storage, is kept current with the data located at the primary storage system. In other words, a copy of the data located at the secondary storage system is kept in synch with the data at the primary storage system as observed by the user of the data. Volume pairs are designated in which a volume in the primary storage system is paired with a volume in the secondary storage system.

With a PPRC system, a PPRC data copy to the recovery or secondary storage system occurs synchronously from the host point of view with write operations to volumes in the primary storage system. With presently available techniques for copying data, multiple disks in the primary storage system contend for paths connecting the primary storage system to the secondary storage system.

When data is written from a host to the primary storage system, the data written to a particular volume is also written to a corresponding volume in the secondary storage system using a path to the secondary storage system. Contention may occur for these paths used to transfer data from volumes in the primary storage system to the secondary storage system. This type of contention causes performance inefficiencies in the system as a whole.

Data transfer occurs in pairs in which data is transferred from a volume in a primary storage system to a corresponding volume in a secondary storage system. These transfers require sets of remote copy commands to be used for each pair to use the paths to transfer data between the volumes in the pair. These sets of commands for data transfers are also referred to as chains. Starting a chain and ending a chain are high overhead operations. Further, hand shaking is used to identify the status of each command in a chain. This hand shaking introduces additional overhead in a transfer of data from a primary storage system to a secondary storage system. This overhead decreases performance because the application system disk write by the host is not considered complete until the secondary system write has been completed. As a result, a completion of a write operation may take far longer than the write to the primary storage system itself. Consequently, performance decreases as traffic increases with increasing numbers of volumes in storage systems.

Further, as the number of PPRC volume pairs are established and attempt to move from duplex pending to a duplex state, the system resources become increasingly degraded as duplex pending pairs are added. Cache space, processor cycles, and data paths are consumed while duplex pending. A duplex pending pair is a pair of corresponding volume pairs in which the system is attempting to copy the primary storage volume to the secondary storage volume. A duplex state pair is a pair of corresponding volume pairs in which the data from the primary storage volume has been copied to the secondary storage volume.

Individual primary volume performance is additionally affected because the host has to compete with the synchronizing task for access to the primary storage volumes. The synchronizing task is the process of copying the primary storage volume to the secondary storage volume. What is needed is a method and system which allows one or more bridge (surrogate) volume pairs to handle the traffic of all PPRC volume pairs and the synchronizing task. With such a method and system, the host would not have to compete for access to a PPRC primary storage volume because a surrogate volume is handling the synchronization task.

SUMMARY OF THE INVENTION

Accordingly, it is an object of the present invention to provide a method and system for transferring data between a primary storage system and a secondary storage system using a bridge (surrogate) volume and an internal snapshot copy of the data being transferred.

It is another object of the present invention to provide a method and system for transferring data between a primary storage volume and a secondary storage volume using a surrogate volume for transferring data and an internal snapshot copy of the data from the primary storage volume to the surrogate volume.

It is a further object of the present invention to provide a method and system for transferring data between primary storage volumes and secondary storage volumes using 1) a primary/secondary surrogate volume pair for transferring data between all of the corresponding primary/secondary storage volume pairs and 2) internal snapshot copies of the data from the primary storage volumes to the primary surrogate volume.

In carrying out the above object s and other objects, the present invention provides a method in a data processing system for transferring data from a primary storage system to a secondary storage system. The primary storage system includes primary storage volumes and a primary bridge volume and the secondary storage system includes secondary storage volumes and a secondary bridge volume. The method includes establishing a link between the primary bridge volume and the secondary bridge volume. The data to be transferred from a primary storage volume to a corresponding secondary storage volume is then copied onto the primary bridge volume by using pointers to the data of the primary storage volume. The copied data is then transferred from the primary bridge volume to the secondary bridge volume over the link. The data is then moved from the secondary bridge volume to the secondary storage volume corresponding to the primary storage volume to put the primary storage volume and the corresponding secondary storage volume in synchronization.

In carrying out the above objects and other objects, the present invention further provides a data processing system in accordance with the method of the present invention.

The advantages accruing to the present invention are numerous. For instance, the present invention provides greater performance in a remote copy environment while storage volume pairs are duplex pending. The present invention serializes the synchronization process for all the volumes to the surrogate pairs and reduces system resource consumption. The response time of a system is not affected with the establishment of few volumes, but as the number of established volumes gets larger then the response time becomes affected. Thus, the present invention does not affect the response time as the established volumes are limited to the number of surrogate volume pairs. In other words, the present invention restricts the number of storage volumes trying to sync to the number of surrogate volume pairs, which is preferably eight or less. Typically, there is on the order of 1024 storage volumes in a storage system.

The above objects and other objects, features, and advantages of the present invention are readily apparent from the following detailed description of the best mode for carrying out the present invention when taken in connection with the accompanying drawings.

BRIEF DESCRIPTION OF THE DRAWINGS

FIGS. 5A–5D illustrate establishment of a data bridge path and pair and a status bridge path and pair in accordance with a preferred embodiment of the present invention;

FIG. 6 illustrates a flowchart of a process for setting up a data bridge and a status bridge is depicted in accordance with a preferred embodiment of the present invention; and FIG. 7 illustrates a flowchart of the process used in a primary data transfer for sending data from a primary data storage system to a secondary data storage system using bridge volumes is depicted in accordance with a preferred embodiment of the present invention.

BEST MODES FOR CARRYING OUT THE INVENTION

Figure 1:
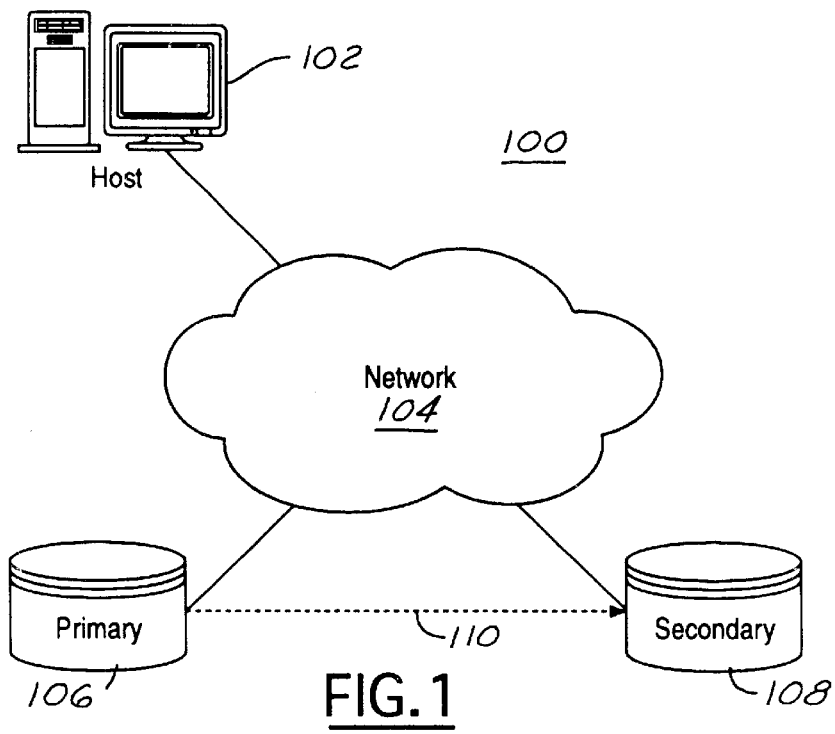
FIG. 1 illustrates a data processing system in which the present invention may be implemented.

Referring now to FIG. 1, a data processing system 100 in which the present invention may be implemented is depicted. Data processing system 100 includes a host 102 connected to network 104. Data may be stored by host 102 in primary storage system 106. Data written to primary storage system 106 is copied to secondary storage system 108 in these examples. The copy process is used to create a copy of the data in primary storage system 106 in secondary storage system 108. In these examples, the copy process is a peer-to-peer remote copy (PPRC) mechanism. In such a system, a write made by host 102 is considered complete only after the data written to primary storage system 106 is also written to secondary storage system 108.

In these examples, host 102 may take various forms, such as a server on a network, a Web server on the Internet, or a mainframe computer. Primary storage system 106 and secondary storage system 108 are disk systems in these examples. Specifically, primary storage system 106 and secondary storage system 108 are each set up as shared virtual arrays to increase the flexibility and manageability of data stored within these systems. Network 104 may take various forms, such as, for example, a local area network (LAN), a wide area network (WAN), the Internet, or an intranet. Network 104 contains various links, such as, for example, fiber optic lines, packet switched communication links, enterprise systems connection (ESCON) fibers, small computer system interface (SCSI) cable, and wireless communication links.

Data processing system 100 is an example of a data processing system in which the present invention may be implemented and not as an architectural limitation to the present invention. For example, host 102 and primary storage system 106 may be connected directly while primary storage system 106 and secondary storage system 108 may be connected by a LAN or a WAN. Further, primary storage system 106 and secondary storage system 108 may be connected to each other by a direct connection 110 rather than through network 104.

The present invention allows for data from different volumes located within primary storage system 106 to be sent to secondary storage system 108 using a chain of unrelated tracks (data) to avoid contention of a single path between these two storage systems. This mechanism avoids overhead associated with allocating and deallocating a path or connection for a data transfer between each pair of volumes. The mechanism of the present invention involves using bridge (surrogate) volume pairs in which, for each surrogate volume pair, a respective bridge volume is located on each storage system. That is, a primary surrogate volume is established in primary storage 106 and a corresponding secondary surrogate volume is established in secondary storage 108. A single path or connection is setup between the respective bridge volume pair. Data is transferred along the path from the primary bridge volume on primary storage system 106 to a secondary bridge volume on secondary storage system 108. These bridge volume pairs handle the transfer of data for all of the volume pairs. A separate pair of volumes, status bridge (surrogate) volumes, are used to transfer status information about the data transfers.

Figure 2:
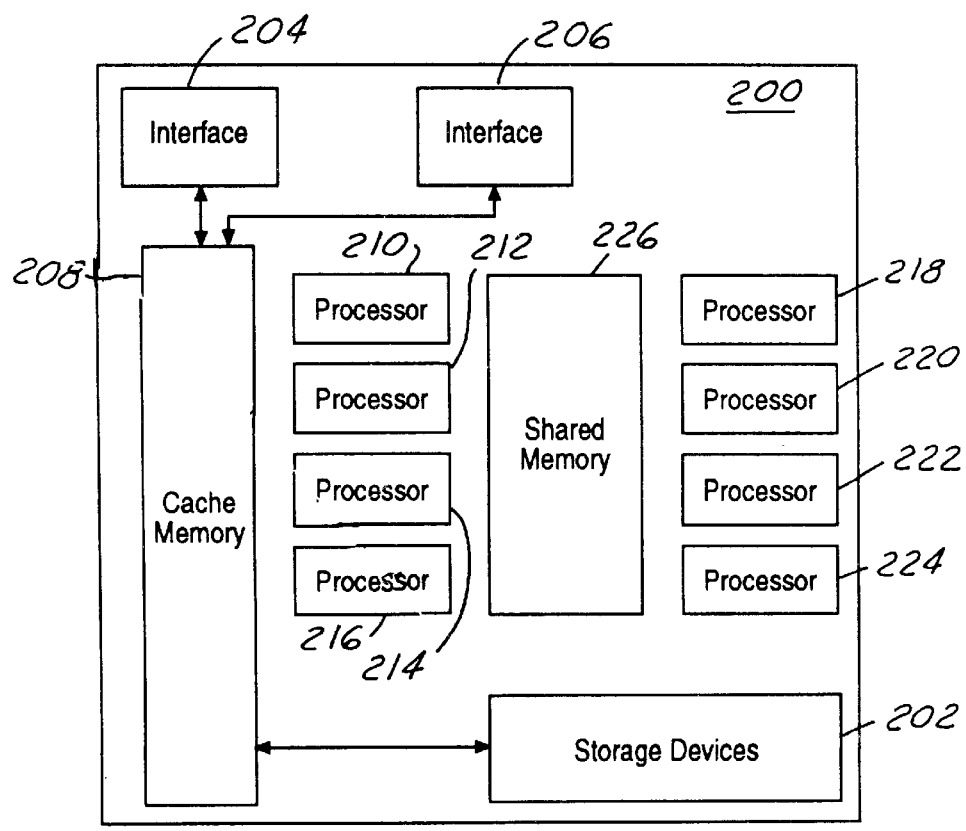
FIG. 2 illustrates a block diagram of a storage system in accordance with a preferred embodiment of the present invention.

Referring now to FIG. 2, a block diagram of a storage system 200 is depicted in accordance with a preferred embodiment of the present invention. Storage system 200 may be used to implement primary storage system 106 or secondary storage system 108. Storage system 200 includes storage devices 202, interface 204, interface 206, cache memory 208, processors 210–224, and shared memory 226. Interfaces 204 and 206 provide a communication gateway through which communication between a data processing system and storage system 200 may occur. In this example, interfaces 204 and 206 may be implemented using a number of different mechanisms, such as ESCON cards, SCSI cards, fiber channel interfaces, modems, network interfaces, or a network hub. Although storage system 200 has two interface units, any number of interface cards may be used depending on the implementation.

In this example, storage system 200 is a shared virtual array. Storage system 200 is a virtual storage system in that each physical storage device may be represented to a data processing system, such as host 100, as a number of virtual devices. In this example, storage devices 202 are a set of disk drives set up as a redundant array of inexpensive disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and manage the reading and writing of data to storage devices 202.

In this example, processors 210–224 are used to write data addressed using a virtual volume to the physical storage devices. For example, a block of data, such as tracks in a virtual volume, may be received by interface 204 for storage. A track is a storage channel on disk, tape, or other storage media. On disks, tracks are concentric circles (hard and floppy disks) or spirals (CDs and videodiscs). On tapes, tracks are arranged in parallel lines. The format of a track is determined by the specific drive in which the track is used. This data is placed in cache memory 208. Processors 210–224 write the data tracks for this volume into a corresponding virtual volume setup using storage devices 202.

The present invention provides a method and system having a mechanism for transferring data between two storage systems. The mechanism of the present invention may be implemented in disk systems using peer-to-peer remote copy (PPRC). The mechanism of the present invention includes a virtual remote copy mechanism in which corresponding pairs of bridge (surrogate) volumes, one bridge volume of a pair located in the primary storage system and the other bridge volume of the pair located in the secondary storage system, handle all of the traffic of all pairs transferring data between primary and secondary storage systems.

In addition to the virtual remote copy mechanism, the mechanism of the present invention includes an internal snapshot copying mechanism for copying all of the data of a primary volume to a primary bridge (surrogate) volume. The internal snapshot copying mechanism makes a copy of a pointer to the data of a primary storage volume and the primary bridge volume uses the pointers to access the data. The internal snapshot copying mechanism makes a copy of the data of a primary storage volume to a primary bridge volume by using pointers to the data in the primary storage volume and then storing the pointers in a map. By using pointers the internal snapshot mechanism can quickly copy the data from the primary storage volume without affecting access of the host to the primary storage volume. The primary bridge volume then transfers the data to a corresponding secondary bridge volume. The secondary bridge volume then transfers the data to the secondary storage volume corresponding to the primary volume without any host access interruption to the primary volume.

The mechanism further includes a volume synchronization queue in which corresponding primary and secondary storage volumes desiring to sync enqueue. The internal snapshot mechanism sequentially copies the data of respective primary storage volumes in the synchronization queue to the primary bridge volume. After the data of a primary storage volume has been copied to the primary bridge volume, the primary storage volume is dequeued and removed from the volume synchronization queue.

The mechanism packages meta-data within the transferred data to identify the original data source and destination storage volumes. This allows the bridge to transfer the data from any primary storage volume to any secondary storage volume. This mechanism also allows the status of each data transfer to be packaged on a separate pair of bridge volumes for transfer from the secondary system back to the primary system. This decouples the status presentation from the transfers that are occurring on the other bridge pair. This decoupling allows uninterrupted transmission of the data without waiting for final status for each data. In general, the data transfers proceed with normal status while the true success or failure status is sent asynchronously on a separate transmission back to the primary system.

The illustration of storage system 200 is not intended to imply architectural limitations of the present invention. Storage system 200 may be implemented using a number of available storage systems modified to provide pairs of bridge volumes used to handle data transfer between the other volume pairs in a primary storage system and a secondary storage system.

Figure 3:
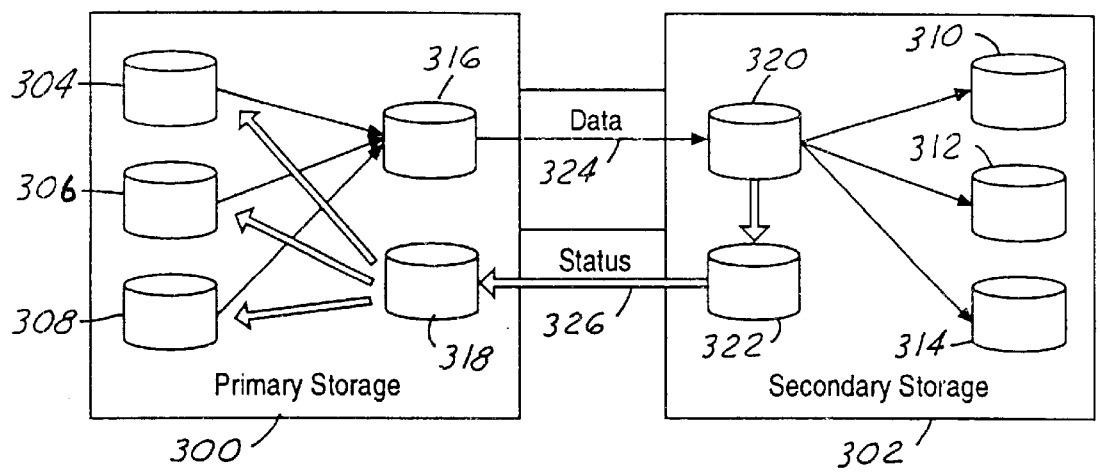
FIG. 3 illustrates a block diagram of data flow paths used to transfer data between a primary storage system and a secondary storage system in accordance with a preferred embodiment of the present invention.

Referring now to FIG. 3, a block diagram illustrating data flow paths used to transfer data between a primary storage system 300 and a secondary storage system 302 is illustrated in accordance with a preferred embodiment of the virtual remote copy mechanism of the present invention. Primary storage system 300 sends data to secondary storage system 302 each time data is written to the primary storage system by a data processing system, such as host 102. Primary storage system 300 and secondary storage system 302 may be implemented using a storage system such as storage system 200.

Primary storage system 300 includes a first set of primary storage volumes 304, 306, and 308. Secondary storage system 302 includes a second set of secondary storage volumes 310, 312, and 314 which correspond to the first set of volumes 304, 306, and 308 in primary storage system 300. The correspondence between the volumes in these two storage systems is set up in pairs such that a volume in primary storage system 300 has a corresponding volume in secondary storage system 302 to form the pair. For example, volume 304 is paired with volume 310, volume 306 is paired with volume 312, and volume 308 is paired with volume 314.

Further, primary storage system 300 includes a primary data bridge (surrogate) volume 316 and a secondary status bridge 318. Secondary storage system 302 includes a secondary data bridge volume 320 and a primary status bridge volume 322. Volumes in each of the storage systems are designated for use in transferring data. As a result of this selection and configuration, primary data bridge volume 316, secondary status bridge volume 318, secondary data bridge volume 320, and primary status bridge volume 322 are reserved for internal use by the storage systems 300 and 302.

With the bridge volumes defined, two paths, data bridge path 324 and status bridge path 326 are established between primary storage system 300 and secondary storage system 302. Data bridge path 324 begins at primary data bridge volume 316 in primary storage system 300 and ends at secondary data bridge volume 320 in secondary storage system 302. Status bridge path 326 begins at primary status bridge volume 322 in secondary storage system 302 and ends at secondary status bridge volume 318. Data written to volumes 304, 306, and 308 are transferred to corresponding volumes 310, 312, and 314. In the depicted examples, the data is in the form of tracks that are copied from a primary volume to a secondary volume.

Figure 4:
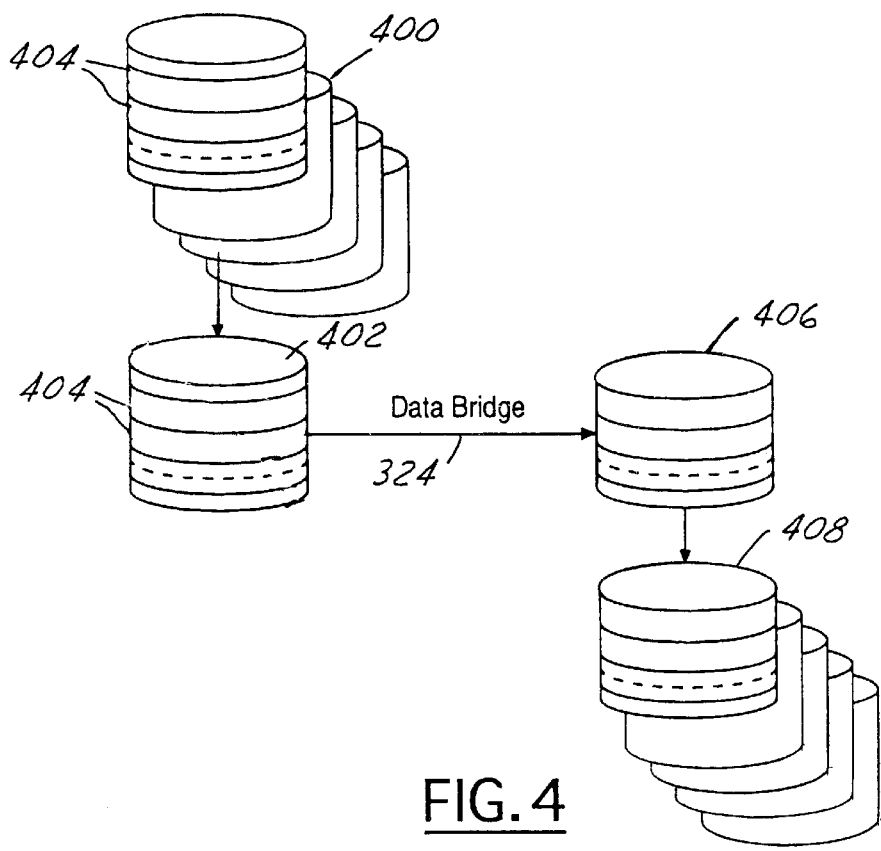
FIG. 4 illustrates the internal snapshot mechanism in accordance with a preferred embodiment of the present invention.

Referring now to FIG. 4 with continual reference to FIG. 3, the internal snapshot mechanism in accordance with a preferred embodiment of the present invention will now be described. The internal snapshot mechanism is for copying data of a primary storage volume 400 to a primary bridge volume 402. The data of primary storage volume 400 is stored in tracks 404 of the primary storage volume. Primary storage volume 400 is enqueued in a volume synchronization queue to initiate the synchronization process. As soon as primary storage volume 400 is next in the volume synchronization queue, the internal snapshot mechanism copies all of the tracks from primary storage volume 400 to primary bridge volume 402. The internal snapshot mechanism copies the data to primary bridge volume 402 using pointers to obtain the data from primary storage volume 400 without having to affect the primary storage volume. Then, primary bridge volume 402 transfers the data tracks across data bridge 324 to the corresponding secondary bridge volume 406. Secondary bridge volume 406 then transfers the data tracks to the secondary storage volume 408 which corresponds with primary storage volume 404. In summary, one at a time each primary storage volume is snapped (copied) to primary bridge volume 404 and once the corresponding primary/secondary storage volume is duplexed, the next primary storage volume is selected from the volume synchronization queue.

Status information is then sent from secondary bridge volume 406 and queued on a volume such as primary status bridge volume 322. After the status information is received on primary status bridge volume 322, status information is returned using status bridge path 326. No requirement is present for status information to be received confirming the writing of data to a secondary volume before data from a primary volume can be written to a corresponding secondary volume. In other words, the transfer of data and the return of status information may occur asynchronously.

In accordance with a preferred embodiment of the present invention, these transfers for different volumes may occur without having to incur the overhead normally required for such transfers. The virtual mapping remote copy (VMRC) mechanism of the present invention allows for the data paths to be maintained until all data transfers from primary storage 300 to secondary storage 302 have been completed. The VMRC mechanism is in contrast to the requirement to allocate a data path to transfer data between volumes in a pair, allocate or deallocate the data path after the data transfer has occurred and allocate another data path to transfer data between volumes in a second pair.

In transferring tracks of data from a primary volume to a corresponding surrogate volume, the target volume is identified such that the data can be relocated to the correct volume once received at the secondary data bridge volume. The target volume is identified by incorporating a header with the data being transferred between bridge volumes across the data path. The header includes virtual track addresses which are used to relocate the data to the appropriate secondary storage volume once the data is received at the secondary bridge volume.

Figure 5A:
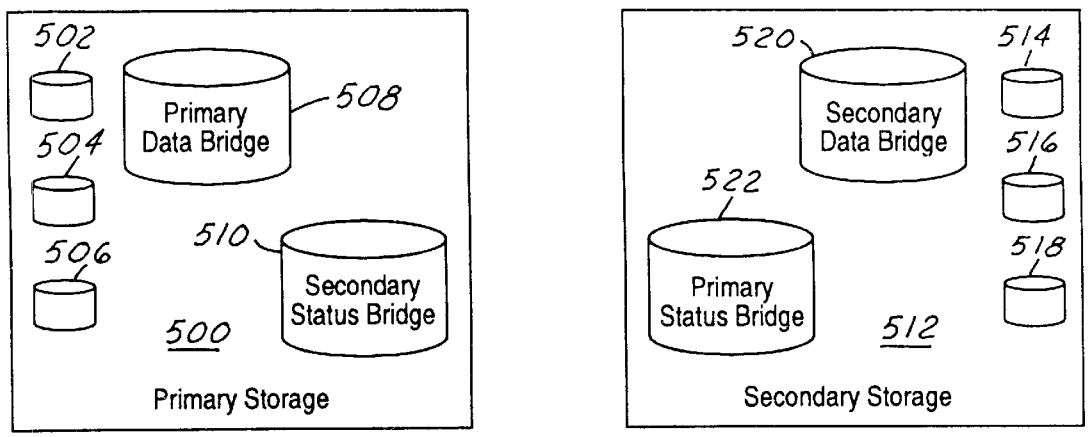

Referring now to FIGS. 5A–5D, diagrams illustrating establishment of a data bridge path and pair and a status bridge path and pair are depicted in accordance with a preferred embodiment of the present invention. The paths illustrated in FIG. 3 may be established using a set of commands to designate volumes as bridge (surrogate) volumes and to designate and establish paths. In FIG. 5A, primary storage 500 contains primary volumes 502, 504, and 506, primary data bridge (surrogate) volume 508, and secondary status bridge volume 510. Secondary storage 512 contains volumes 514, 516, and 518, secondary data bridge (surrogate) volume 520, and primary status bridge 522.

Primary volumes 502, 504, and 506 are configured to store data while primary data bridge volume 508 and secondary status bridge volume 510 are configured by a user logging in and selecting unconfigured volumes and configuring the selected volumes for use as a bridge rather than as a volume for use in storing data. In secondary storage 512, a similar selection has been made to select secondary data bridge volume 520 and primary status bridge volume 522.

Figure 5B:
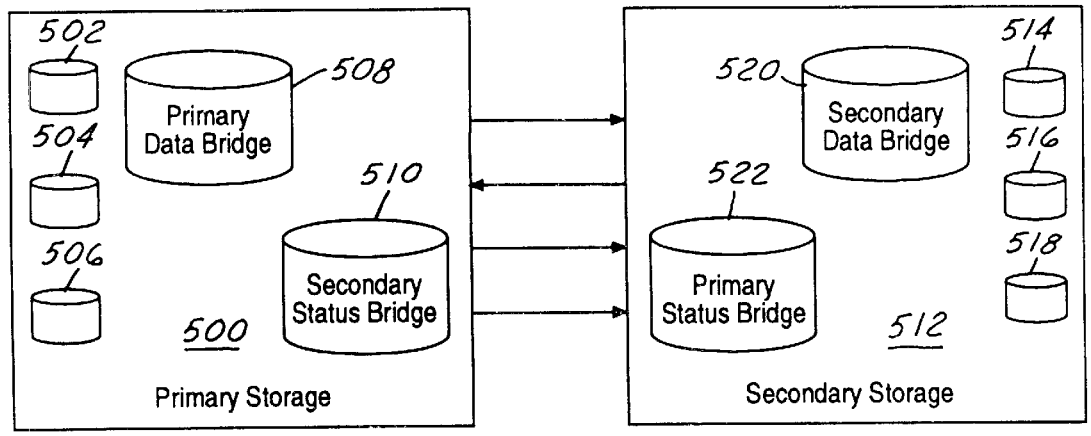

In FIG. 5B, at least two paths are established between primary storage 500 and secondary storage 512. The paths are established using establish path commands. In this example, these commands are direct access storage device commands sent in an ESCON command frame. One path is used as a data bridge path and another path is used as a status bridge path. In this example, four paths, paths 524, 526, 528, and 530, have been established to secondary storage 512 from primary storage 500. Next, an establish pair command is issued to primary data bridge 508.

Figure 5C:
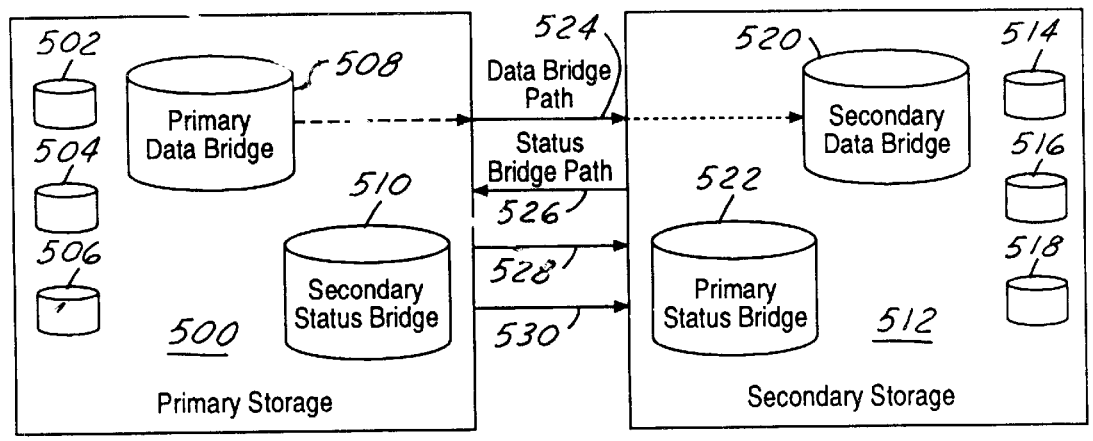

In FIG. 5C, path configuration occurs after the establish pair command has been issued to establish pairs of bridge volumes. Two available paths between primary storage 500 and secondary storage 512 are identified. One path is designated as the data bridge path. In this example, path 524 becomes the data bridge path. An establish path command is issued to secondary storage 512 to establish a status bridge path from secondary storage 512 back to primary storage 500. In this example, path 526 is the status bridge path.

In FIG. 5D, an establish pair command is issued from primary storage 500 across data bridge path 524 to establish a status bridge pair between primary status bridge volume 522 and secondary status bridge volume 510. After both these pairs have been established, data may be sent to secondary storage 512 from primary storage 500 using primary data bridge volume 508, secondary data bridge volume 520, secondary status bridge volume 510, and primary status bridge volume 522. The tracks of data may then be sent using data bridge path volume 524 in the manner described above in FIGS. 3 and 4. In this example, only one data bridge path and status bridge path are established. Another data bridge and status bridge path could be established using paths 528 and 530.

Referring now to FIG. 6, a flowchart of a process for setting up a data bridge and a status bridge is depicted in accordance with a preferred embodiment of the present invention. The process begins by defining data bridge and status bridge volumes on the primary and secondary storage systems (step 600). Step 600 may be initiated by a user at the host computer or from some other computer. Next, an establish pair command is issued by the host computer to the primary data bridge volume (step 602). An update secondary device status command is sent to the secondary data bridge volume (step 604).

Next, a path is set up in the opposite direction from the secondary storage system to the primary storage system (step 606). An establish pair command is then issued in the primary system to the secondary system for the status bridge (step 608). An update secondary device status command is sent from the secondary storage system to the primary storage system for the status bridge (step 610). A notification is sent from the secondary storage system to the primary storage system when a status bridge is established (step 612). The host system is notified by the primary storage system that the pair is complete (step 614) with the process terminating thereafter.

In transferring tracks of data from a primary storage system to a secondary storage system, a network link, such as a WAN link, with bridge paths and pairs is employed in these examples. Tracks of data are transferred from one data bridge volume to another data bridge volume using the network link. This transfer may be characterized using four phases: a primary data transfer, a secondary data transfer, a status packet send, and a status packet received.

Referring now to FIG. 7, a flowchart of the process used in a primary data transfer for sending data from a primary data storage system to a secondary data storage system using bridge volumes is depicted in accordance with a preferred embodiment of the present invention. The steps illustrated in FIG. 7 illustrates a logical series of events used to process a single volume of data. This process is repeated for each volume of data that is to be sent to the secondary storage system.

Referring now to FIG. 7, a flowchart of a process for queueing primary storage volumes in a volume synchronization queue and then transferring the data of the primary storage volumes to secondary storage volumes is depicted in accordance with a preferred embodiment of the present invention. The process begins by placing primary storage volumes into a volume synchronization queue (step 700). The data of a primary storage volume is then snapped to a primary bridge volume using the internal snapshot copying mechanism of the present invention (step 704). The primary storage volume is then dequeued and removed from the volume synchronization queue (step 702). The primary bridge volume then transfers the data to a corresponding secondary bridge volume (step 706). The secondary bridge volume then redirects the data to the secondary storage volume corresponding to the primary volume (step 708). The primary storage volume is then notified that the synchronization is complete and the process then repeats by snapping the data of a new primary storage volume to a primary bridge volume.

Thus, the present invention provides a mechanism for transferring data from a primary storage system to a secondary storage system in which the data transferred is handled by a set of bridge volumes configured to snapshot copy and transfer data and return status information for other volumes in the storage systems. The use of dedicated volumes for transferring data reduces the number of requests to allocate and deallocate paths to transfer data between volume pairs. A path is a connection or link, established to transfer data over a physical medium, such as a cable or network, connecting the storage systems. In this manner, a path may be established and used to transfer data for a number of different volume pairs. The reduction in these requests decreases the overall time used to set up data transfers. The use of the snapshot copy enables the bridge volumes to handle data synchronization responsibilities in addition to data transferring responsibilities thereby allowing the host to not have to compete for access to primary storage volumes.

It is important to note that while the present invention has been described in the context of a fully functioning data processing system, those of ordinary skill in the art will appreciate that the processes of the present invention are capable of being distributed in the form of a computer readable medium of instructions a n d a variety of forms and that the present invention applies equally regardless of the particular type of signal bearing media actually used to carry out the distribution. Examples of computer readable media include recordable type media such as a floppy disc, a hard disk drive, a RAM, CD-ROMs, and transmission type media such as digital and analog communications links.

Thus it is apparent that there has been provided, in accordance with the present invention, a method and system for transferring data between a primary storage system and a secondary storage system using a bridge (surrogate) volume and an internal snapshot copy of the data being transferred that fully satisfy the objects, aims, and advantages set forth above. while the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method in a data processing system for transferring data from a primary storage system to a secondary storage system, wherein the primary storage system includes a plurality of primary storage volumes and a primary bridge volume and the secondary storage system includes a plurality of secondary storage volumes and a secondary bridge volume, the method comprising:

establishing a link between the primary bridge volume and the secondary bridge volume;

copying data to be transferred from a primary storage volume to a corresponding secondary storage volume onto the primary bridge volume by using pointers to the data of the primary storage volume;

transferring the copied data from the primary bridge volume to the secondary bridge volume over the link; and transferring the data from the secondary bridge volume to the secondary storage volume corresponding to the primary storage volume to put the primary storage volume and the corresponding secondary storage volume in synchronization.

2. The method of claim 1 further comprising:

establishing a storage volume synchronization queue;

placing primary storage volumes desiring to sync with corresponding secondary storage volumes into the volume synchronization queue;

selecting one primary storage volume from the volume synchronization queue;

copying data of the selected primary storage volume onto the primary bridge volume by using pointers to the data of the selected primary storage volume; and removing the selected primary storage volume from the volume synchronization queue.

3. The method of claim 2 further comprising:

selecting a second primary storage volume from the volume synchronization queue;

copying data of the selected second primary storage volume onto the primary bridge volume by using pointers to the data of the selected second primary storage volume; and removing the selected second primary storage volume from the volume synchronization queue.

4. The method of claim 1 wherein the primary storage system further includes a secondary status volume and the secondary storage system includes a primary status volume, the method further comprising:

establishing a status link between the primary status volume and the secondary status volume;

generating status information for a status of data transferred from the primary storage device to the secondary storage device;

placing the status information on the primary status volume; and transferring the status information from the primary status volume to the secondary status volume over the status link.

5. The method of claim 4 wherein:

transfer of data and transfer of status information occurs asynchronously.

6. The method of claim 1 wherein:

the primary storage volumes and the secondary storage volumes are physical devices.

7. The method of claim 6 wherein:

the physical devices are disk drives.

8. The method of claim 1 wherein:

the primary storage volumes and the secondary storage volumes are virtual devices.

9. A data processing system comprising:

a network;

a primary storage system including a plurality of primary storage volumes and a primary bridge volume;

a secondary storage system including a plurality of secondary storage volumes and a secondary bridge volume; and a host computer, wherein writing of data by the host computer to primary storage volumes initiates establishing a link between the primary bridge volume and the secondary bridge volume, copying data to be transferred from a primary storage volume to a corresponding secondary storage volume onto the primary bridge volume by using pointers to the data of the primary storage volume, transferring the data from the primary bridge volume to the secondary bridge volume over the link, and transferring the data from the secondary bridge volume to the secondary storage volume corresponding to the primary storage volume to put the primary storage volume and the corresponding secondary storage volume in synchronization.

10. The system of claim 9 wherein:

the network is a wide area network (WAN).

11. The system of claim 9 wherein:

the network is a local area network (LAN).

12. The system of claim 9 wherein:

writing of data by the host computer to primary storage volumes further initiates establishing a storage volume synchronization queue, placing primary storage volumes desiring to sync with corresponding secondary storage volumes into the volume synchronization queue, selecting one primary storage volume from the volume synchronization queue, copying data of the selected primary storage volume onto the primary bridge volume by using pointers to the data of the selected primary storage volume, and removing the selected primary storage volume from the volume synchronization queue.

13. The system of claim 12 wherein:

after the selected primary storage volume has been removed from the volume synchronization queue, the writing of data by the host computer to primary storage volumes further initiates selecting a second primary storage volume from the volume synchronization queue, copying data of the selected second primary storage volume onto the primary bridge volume by using pointers to the data of the selected second primary storage volume, and removing the selected second primary storage volume from the volume synchronization queue.

14. The system of claim 9 wherein:

the primary storage volumes and the secondary storage volumes are physical devices.

15. The system of claim 14 wherein:

the physical devices are disk drives.

16. The system of claim 9 wherein:

the primary storage volumes and the secondary storage volumes are virtual devices.

\* \* \* \* \*